US009729250B2

United States Patent
Yu

(10) Patent No.: US 9,729,250 B2
(45) Date of Patent: *Aug. 8, 2017

(54) METHODS AND APPARATUS FOR COHERENT DUOBINARY SHAPED PM-QPSK SIGNAL PROCESSING

(71) Applicant: ZTE (USA) Inc., Morristown, NJ (US)

(72) Inventor: Jianjun Yu, Basking Ridge, NJ (US)

(73) Assignee: ZTE (USA) Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/420,660

(22) PCT Filed: Aug. 8, 2013

(86) PCT No.: PCT/US2013/054201
§ 371 (c)(1),
(2) Date: Feb. 9, 2015

(87) PCT Pub. No.: WO2014/026040
PCT Pub. Date: Feb. 13, 2014

(65) Prior Publication Data
US 2015/0222368 A1   Aug. 6, 2015

Related U.S. Application Data

(60) Provisional application No. 61/681,462, filed on Aug. 9, 2012.

(51) Int. Cl.
  *H04B 10/61*   (2013.01)
  *H04L 27/01*   (2006.01)
  (Continued)

(52) U.S. Cl.
  CPC ..... *H04B 10/6165* (2013.01); *H04B 10/5167* (2013.01); *H04B 10/5561* (2013.01);
  (Continued)

(58) Field of Classification Search
  CPC ............ H04B 10/6162; H04B 10/6166; H04B 10/5561; H04B 10/5167; H04B 10/6165;
  (Continued)

(56) References Cited

U.S. PATENT DOCUMENTS 6,493,397 B1   12/2002   Takahashi et al.
9,225,455 B2   12/2015   Yu et al.
(Continued)

FOREIGN PATENT DOCUMENTS

JP   09-238173 A   9/1997
JP   11-196146 A   7/1999

OTHER PUBLICATIONS

Chien, H.-C., et al., "Performance Assessment of Noise-suppressed Nyquist-WDM for Terabit Superchannel Transmission," Journal of Lightwave Technology, 30(24):3965-3971, Jul. 2012.
(Continued)

*Primary Examiner* — Leslie Pascal
(74) *Attorney, Agent, or Firm* — Perkins Coie LLP

(57) ABSTRACT

Systems, devices and techniques for receiving a signal comprising a quadrature duobinary modulated signal include performing channel equalization of the received signal using a constant multi-modulus to obtain a set of channel estimation coefficients and a stream of symbols, partitioning, based on modulus, the stream of symbols into three partitions, estimating carrier frequency based on the partitioned stream of symbols, recovering a phase of the signal using a maximum likelihood algorithm, and decoding the partitioned stream of symbols to recover data.

20 Claims, 13 Drawing Sheets

(51) Int. Cl.
| | |
|---|---|
| H04L 27/20 | (2006.01) |
| H04L 27/34 | (2006.01) |
| H04B 10/516 | (2013.01) |
| H04B 10/556 | (2013.01) |
| H04J 14/06 | (2006.01) |
| H04J 14/02 | (2006.01) |
| H04L 25/03 | (2006.01) |
| H04L 27/22 | (2006.01) |
| H04L 27/00 | (2006.01) |

(52) U.S. Cl.
CPC ..... *H04B 10/6162* (2013.01); *H04B 10/6166* (2013.01); *H04L 25/03019* (2013.01); *H04L 27/01* (2013.01); *H04L 27/2096* (2013.01); *H04L 27/223* (2013.01); *H04L 27/34* (2013.01); *H04J 14/02* (2013.01); *H04J 14/0282* (2013.01); *H04J 14/06* (2013.01); *H04L 2027/0048* (2013.01); *H04L 2027/0067* (2013.01)

(58) Field of Classification Search
CPC ........... H04L 25/03019; H04L 27/2096; H04L 27/223; H04L 27/34; H04L 2027/0048; H04L 2027/0067; H04L 27/01; H04J 14/06; H04J 14/0282; H04J 14/02
See application file for complete search history.

(56) References Cited

U.S. PATENT DOCUMENTS

| | | |
|---|---|---|
| 2005/0286908 A1 | 12/2005 | Way |
| 2008/0123739 A1 | 5/2008 | Reznic et al. |
| 2009/0190926 A1 | 7/2009 | Charlet et al. |
| 2010/0098411 A1 | 4/2010 | Nakashima et al. |
| 2010/0111543 A1 | 5/2010 | Chow et al. |
| 2010/0150577 A1 | 6/2010 | Essiambre et al. |
| 2011/0002689 A1 | 1/2011 | Sano et al. |
| 2012/0148261 A1 | 6/2012 | Yu |
| 2012/0155890 A1 | 6/2012 | Zhou et al. |
| 2012/0163831 A1 | 6/2012 | Eiselt |
| 2013/0089339 A1 | 4/2013 | Liu et al. |
| 2013/0330070 A1 | 12/2013 | Yu |
| 2014/0233949 A1 | 8/2014 | Chien et al. |
| 2015/0093118 A1 | 4/2015 | Jia et al. |
| 2015/0110492 A1 | 4/2015 | Yu et al. |
| 2016/0028577 A1 | 1/2016 | Yu et al. |
| 2016/0112143 A1 | 4/2016 | Yu et al. |

OTHER PUBLICATIONS

Dong, Z., et al., "7×224 Gb/s/ch Nyquist-WDM Transmission Over 1600-km SMF-28 Using PDM-CSRZ-QPSK Modulation", IEEE Photonics Technology Letters, 24(13):1157-1159, Jul. 2012.
Fatadin, I., et al., "Compensation of Frequency Offset for 16-QAM Optical Coherent Systems Using QPSK Partitioning", IEEE Photonics Technology Letters, 23(17):1246-1248, Sep. 2011.
Gao, Y., et al., "Low-Complexity Two-Stage Carrier Phase Estimation for 16-QAM Systems using QPSK Partitioning and Maximum Likelihood Detection," Optical Fiber Communication Conference and Exposition, and the National Fiber Optic Engineers Conference (OFC/NFOEC), Los Angeles, CA, Paper OMJ6, pp. 1-3, Mar. 2011.
International Search Report and Written Opinion mailed on Nov. 14, 2013 for International Application No. PCT/US2013/054201, filed Aug. 8, 2013 (7 pages).
Jia, Z., et al., "Field Transmission of 100 G and Beyond: Multiple Baud Rates and Mixed Line Rates Using Nyquist-WDM Technology," Journal of Lightwave Technology, 30(24):3793-3804, Dec. 2012.
Kikuchi, K., et al., "Coherent Demodulation of Optical Quadrature Duobinary Signal with Spectral Efficiency of 4 bit/s/Hz per Polarization," 33rd European Conference and Exhibition of Optical Communication (ECOC), Berlin, Germany, Paper 9.3.4, pp. 1-2, Sep. 2007.
Li, J., et al., "Approaching Nyquist Limit in WDM Systems by Low-Complexity Receiver-Side Duobinary Shaping," Journal of Lightwave Technology, 30(11):1664-1676, Jun. 2012.
Li, J., et al., "Spectrally Efficient Quadrature Duobinary Coherent Systems With Symbol-Rate Digital Signal Processing", Journal of Lightwave Technology, 29(8):1098-1104, Apr. 2011.
Lyubomirsky, I., "Quadrature Duobinary for High-Spectral Efficiency 100G Transmission," Journal of Lightwave Technology, 28(1):91-96, Jan. 2010.
Lyubomirsky, I., "Quadrature Duobinary Modulation for 100G Transmission Beyond the Nyquist Limit," Optical Fiber Communication Conference and Exposition, and the National Fiber Optic Engineers Conference (OFC/NFOEC), San Diego, CA, Paper OThM4, pp. 1-3, Mar. 2010.
Machi, F., et al., "111-Gb/s PolMux-Quadrature Duobinary for Robust and Bandwidth Efficient Transmission," IEEE Photonics Technology Letters, 22(11):751-753, Jun. 2010.
Yu, J., et al., "Field Trial Nyquist-WDM Transmission of 8×216.4Gb/s PDM-CSRZ-QPSK Exceeding 4b/s/Hz Spectral Efficiency," Optical Fiber Communication Conference and Exposition, and the National Fiber Optic Engineers Conference (OFC/NFOEC), Los Angeles, CA, Paper PDP5D.3, pp. 1-3, Mar. 2012.
Zhou, X., et al., "Cascaded two-modulus algorithm for blind polarization de-multiplexing of 114-Gb/s PDM-8-QAM optical signals," Optical Fiber Communication Conference and Exposition, and the National Fiber Optic Engineers Conference (OFC/NFOEC), San Diego, CA, Paper OWG3, pp. 1-3, Mar. 2009.
Armstrong, J., "OFDM for Optical Communications," Journal of Lightwave Technology, 27(3):189-204, Feb. 2009.
Cao, Z., et al., "Direct-Detection Optical OFDM Transmission System Without Frequency Guard Band," IEEE Photonics Technology Letters, 22(11):736-738, Jun. 2010.
Hang, J.H., et al., "Filtering Tolerance of 108-Gb/s PolMux Quadrature Duobinary Signal on 25-GHz Grid," Optical Fiber Communication Conference and Exposition, and the National Fiber Optic Engineers Conference (OFC/NFOEC), Los Angeles, CA, Paper OMR4, pp. 1-3, Mar. 2011.
Chinese Office Action mailed on May 4, 2016 for Chinese Patent Application No. 201380042337.2, filed Aug. 8, 2013 (8 pages).
European Search Report mailed on Aug. 3, 2015 for European Patent Application No. 13827264.6, filed Aug. 8, 2013 (8 pages).
Jansen, S.L., et al., "Coherent Optical 25.8-Gb/s OFDM Transmission Over 4160-km SSMF," Journal of Lightwave Technology, 26(1):6-15, Jan. 2008.
Japanese Office Action mailed on Feb. 23, 2016 for Japanese Patent Application No. 2015-526718, filed Aug. 8, 2013 (7 pages).
Kobayashi, T., et al., "Over 100 Gb/s Electro-Optically Multiplexed OFDM for High-Capacity Optical Transport Network," Journal of Lightwave Technology, 27(16):3714-3720, Aug. 2009.
Leven, A., et al., "Frequency Estimation in Intradyne Reception," IEEE Photonics Technology Letters, 19(6):366-368, Mar. 2007.
Li, C., et al. "Investigation of Coherent Optical Multiband DFT-S OFDM in Long Haul Transmission," IEEE Photonics Technology Letters, 24(19):1704-1707, Oct. 2012.
Lowery, A.J., "Improving Sensitivity and Spectral Efficiency in Direct-Detection Optical OFDM Systems," Optical Fiber Communication Conference and Exposition, and the National Fiber Optic Engineers Conference (OFC/NFOEC), San Diego, CA, Paper OMM4, pp. 1-3, Feb. 2008.
Peng, W.-R., et al., "Per-symbol-based digital back-propagation approach for PDM-CO-OFDM transmission systems," Optics Express, 21(2):1547-1554, Jan. 2013.
Peng, W.-R., et al. "Simple Carrier Recovery Approach for RF-Pilot-Assisted PDM-CO-OFDM Systems," Journal of Lightwave Technology, 31(15):2555-2564, Aug. 2013.
Pfau, T., et al., "Hardware-Efficient Coherent Digital Receiver Concept With Feedforward Carrier Recovery for M-QAM Constellations," Journal of Lightwave Technology, 27(8):989-999, Apr. 2009.

(56) References Cited

OTHER PUBLICATIONS

Tao, L., et al., "Analysis of Noise Spread in Optical DFT-S OFDM Systems," Journal of Lightwave Technology, 30 (20):3219-3225, Oct. 2012.
Viterbi, A., et al., "Nonlinear Estimation of PSK-Modulated Carrier Phase with Application to Burst Digital Transmission," IEEE Transactions on Information Theory, 29(4):543-551, Jul. 1983.
Wang, H., et al., "APSK Modulated CO-OFDM System With Increased Tolerance Toward Fiber Nonlinearities," IEEE Photonics Technology Letters, 24(13):1085-1087, Jul. 2012.
Winzer, P.J., et al., "Spectrally Efficient Long-Haul Optical Networking Using 112-Gb/s Polarization-Multiplexed 16-QAM," Journal of Lightwave Technology, 28(4):547-556, Feb. 2010.
Yang, Q., et al., "Guard-band influence on orthogonal-band-multiplexed coherent optical OFDM," Optics Letters, 33 (19):2239-2241, Oct. 2008.
Yu, J., et al "1.96 Tb/s (21×100 Gb/s) OFDM Optical Signal Generation and Transmission Over 3200-km Fiber," IEEE Photonics Technology Letters, 23(15):1061-1063, Aug. 2011.
Yu, J., et al., "Transmission of 8×480-Gb/s super-Nyquist-filtering 9-QAM-like signal at 100 GHz-grid over 5000-km SMF-28 and twenty-five 100 GHz-grid ROADMs," Optics Express, 21(13):15686-15691, Jul. 2013.
Zhang J. et al., "Improved Quadrature Duobinary System Performance Using Multi-Modulus Equalization," IEEE Photonics Technology Letters, 25(16):1630-1633, Aug. 2013.
Zhang, J., et al "Multi-Modulus Blind Equalizations for Coherent Quadrature Duobinary Spectrum Shaped PM-QPSK Digital Signal Processing," Journal of Lightwave Technology, 31(7):1073-1078, Apr. 2013.
Zhou, X., et al , "Multi-Level, Multi-Dimensional Coding for High-Speed and High-Spectral-Efficiency Optical Transmission," Journal of Lightwave Technology, 27(16):3641-3653, Aug. 2009.
Zhou, X., et al., "Transmission of 32-Tb/s Capacity Over 580 km Using RZ-Shaped PDM-8QAM Modulation Format and Cascaded Multimodulus Blind Equalization Algorithm," Journal of Lightwave Technology, 28(4):456-465, Feb. 2010.
Zhou, X., et al , "64-Tb/s, 8 b/s/Hz, PDM-36QAM Transmission Over 320 km Using Both Pre- and Post-Transmission Digital Signal Processing," Journal of Lightwave Technology, 29(4):571-577, Feb. 2011.
Zhou, X., et al., "PDM-Nyquist-32QAM for 450-Gb/s Per-Channel WDM Transmission on the 50 GHz ITU-T Grid," Journal of Lightwave Technology, 30(4):553-559, Feb. 2012.
Fatadin, I., et al., "Laser Linewidth Tolerance for 16-QAM Coherent Optical Systems Using QPSK Partitioning," IEEE Photonics Technology Letters, 22(9):631-633, May 2010.
Huang, M.-F., et al., "EDFA-Only WDM 4200-km Transmission of OFDM-16QAM and 32QAM," IEEE Photonics Technology Letters, 24(17):1466-1468, Sep. 2012.
Li, F., et al., "Blind equalization for dual-polarization two-subcarrier coherent QPSK-OFDM signals," Optics Express, 39(2):201-204, Jan. 2014.
Li, F., et al., "Transmission and reception of Quad-Carrier QPSK-OFDM signal with blind equalization and overhead-free operation," Optics Express, 21(25):30999-31005, Dec. 2013.
Liu, X., et al., "448-Gb/s Reduced-Guard-Interval CO-OFDM Transmission Over 2000 km of Ultra-Large-Area Fiber and Five 80-GHz-Grid ROADMs," Journal of Lightwave Technology, 29(4):483-490, Feb. 2011.
Sano, A., et al., "No-Guard-Interval Coherent Optical OFDM for 100-Gb/s Long-Haul WDM Transmission," Journal of Lightwave Technology, 27(16):3705-3713, Aug. 2009.
Shieh, W., et al., "Coherent optical OFDM: theory and design," Optics Express, 16(2):841-859, Jan. 2008.

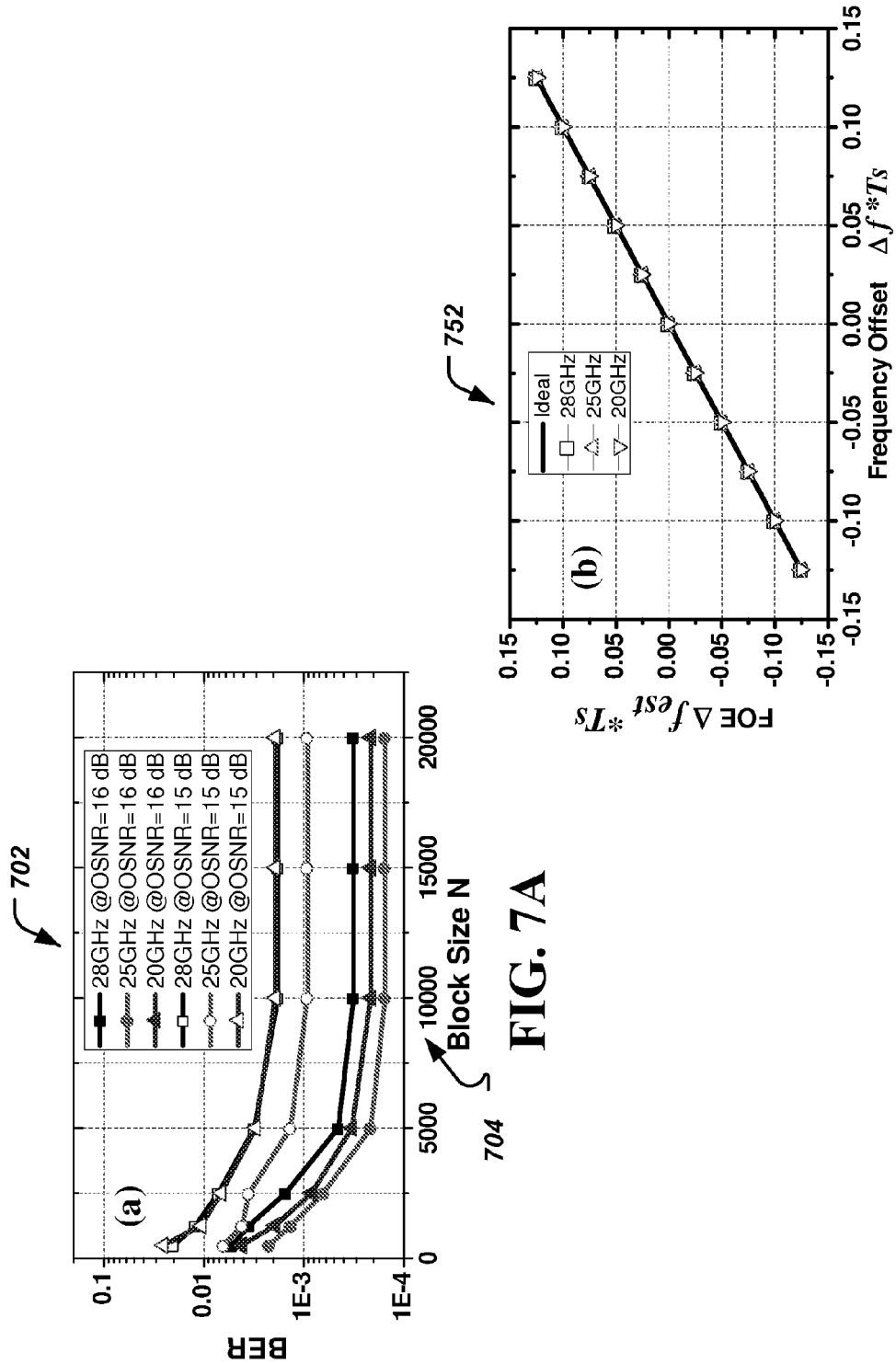

METHODS AND APPARATUS FOR COHERENT DUOBINARY SHAPED PM-QPSK SIGNAL PROCESSING

CROSS REFERENCE TO RELATED APPLICATIONS

This patent application claims the benefit of U.S. Provisional Patent Application No. 61/681,462, filed on Aug. 9, 2012. The entire content of the before-mentioned patent application is incorporated by reference as part of the disclosure of this application.

TECHNICAL FIELD

This patent document relates to systems, devices and techniques for processing of optical signals.

BACKGROUND

Networks that use optical communications medium, such as fiber optic, are becoming increasingly popular to meet ever-growing bandwidth demand. Optical networks are often used to carry high bandwidth video data to/from users to the network and also in backhaul operation of a network.

Techniques are needed for improved optical communications performance.

SUMMARY

This patent document provides, among others, systems, devices and techniques that are useful in improving the performance of optical communications receivers.

In one aspect, the disclosed techniques include a blind polarization de-multiplexing technique based on a cascaded multi-modulus algorithm, a partitioning of quadrature phase signal keying (QPSK) using multi-modulus frequency offset estimation (FOE), and carrier phase recovery (CPR) with maximum likelihood (ML) phase estimation.

This and other aspects and their implementations are described in greater detail in the drawings, the description and the claims.

BRIEF DESCRIPTION OF DRAWINGS

FIGS. 7A-7B illustrate (A) Impact of block size N on the performance of FOE; (B) performance of FOE algorithm for different frequency offset.

DETAILED DESCRIPTION

A novel digital signal processing scheme (DSP) for quadrature duobinary (QDB) spectrum shaped polarization multiplexed quadrature phase shift keying (PM-QPSK) based on multi-modulus blind equalizations (MMBE) is disclosed and demonstrated with both simulation and experimental results. The algorithms for this novel digital signal processing scheme include the cascaded multi-modulus algorithm (CMMA) for blind polarization de-multiplexing, multi-modulus QPSK partitioning frequency offset estimation (FOE) and two stage carrier phase recovery (CPR) with maximum likelihood phase estimation. The final signal is detected by maximum-likelihood sequence detection (MLSD) for data BER measurement. The feasibility of the disclosed digital signal processing scheme is demonstrated by the experiment of 112 Gb/s QDB spectrum shaped PM-QPSK signal with a 25 GHz bandwidth waveshaper for Nyquist WDM channels.

The following abbreviations are used in the present document.

| Acronym | Fullform |
| --- | --- |
| ADC | Analog to Digital Conversion |
| BER | Bit Error Rate |
| CD | Chromatic Dispersion |
| CMA | Constant Modulus Algorithm |
| CMBE | Constant Modulus Blind Equalization |
| CMMA | Cascaded Multi Modulus Algorithm |
| CPR | Carrier Phase Recovery |
| DSP | Digital Signal Processing/Processor |
| ECL | External Cavity Laser |
| FOE | Frequency Offset Estimation |
| ML | Maximum Likelihood |
| MLSD | Maximum Likelihood Sequence Detection |
| MMBE | Multi Modulus Blind Equalization |
| NWDM | Nyquist Wave Division Multiplexing |
| OC | Optical Carrier |
| OSNR | Optical Signal To Noise Ratio |
| PBC | Polarization Beam Combiner |
| PDM | Polarization Division Multiplexing |
| PM | Polarization Modulation |
| PPG | Pulse Pattern Generator |
| QAM | Quadrature Amplitude Modulation |
| QDB | Quadrature Duo Binary |
| QPSK | Quadrature Phase Shift Keying |
| RD-CMA | Radius Directed Constant Modulus Algorithm |
| SC | Single Carrier |
| SE | Spectral Efficiency |
| VVPE | Viterbi - Viterbi Phase Estimation |
| WSS | Wavelength Selective Switch |

Figure 13:
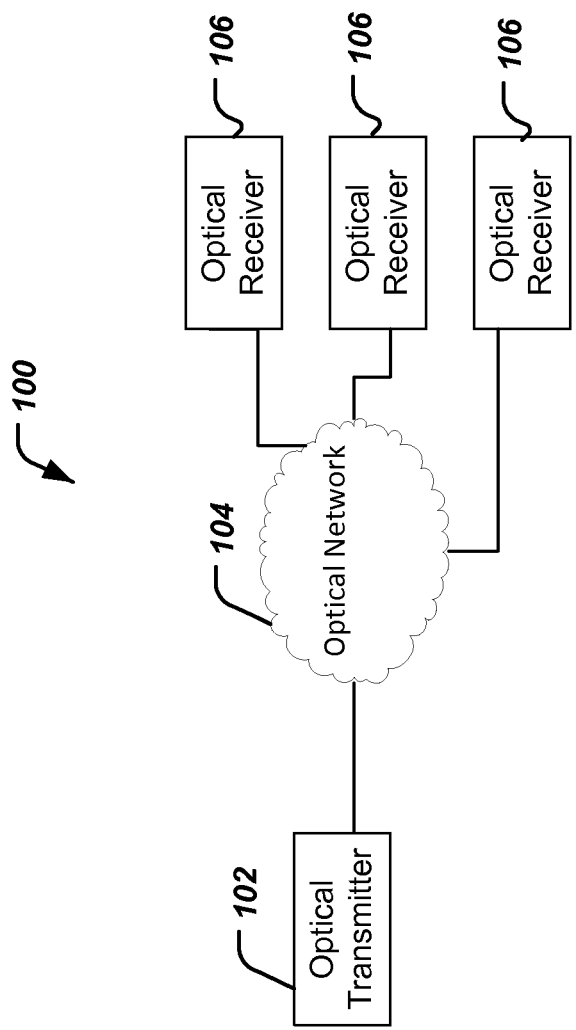
FIG. 13 depicts a block diagram representation of an optical communication system.

FIG. 13 is a block diagram representation of an optical communication system 100 where the subject technology disclosed of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 13 for clarity. The disclosed transmission techniques can be implemented in the transmission subsystem of the transmitter 102. The disclosed reception techniques can be implemented in the receiver subsystem of the receiver 106.

Recently, QDB spectrum shaping technique has attracted a lot of attentions due to its nearly doubled SE and tolerance to channel crosstalk and CD with respect to QPSK signals especially in 100 G (100 Gigabit per second) and 200 G (200 Gigabit per second) coherent optical communications. A SE of >4 bit/s/Hz has been demonstrated by using the QDB format and PolMux scheme with enhanced tolerance to the narrow optical filtering. However, due to constellation zero point caused by filtering effect, the conventional CMBE algorithms for PM QPSK coherent detection are not compatible with the new techniques. To allow for use of conventional DSP-based schemes, some conventional techniques use pre-filtering and post-filtering stages. Eighth power based Viterbi carrier phase recovery (CPR) has also been used in QDB systems. However, only one polarization is considered in the conventional techniques. A PM QDB system with radius-directed constant modulus algorithm (RD-CMA) has also been previously proposed. However, this implementation fails to take into account some key adaptive equalization including carrier frequency offset estimation and phase recovery. In conventional art, a cascaded multi-modulus algorithm (CMMA) algorithm used in PM 8-QAM systems shows good modulus decision performances, which gives a possibility for multi-modulus blind equalizations (MMBE) used in QDB PM-QPSK system. On the other hand some conventional embodiments show the advantages of maximum-likelihood sequence detection (MLSD) for QDB PM-QPSK signals.

In this document, we disclose and provide results of experiments for a digital signal processing (DSP) scheme for QDB spectrum shaped PM-QPSK based on MMBE. In some embodiments, a CMMA algorithm for blind polarization de-multiplexing, multi-modulus QPSK partitioning FOE and two stages CPR with ML phase estimation is disclosed. The final signal is detected by MLSD for data BER measurement. The feasibility of the disclosed digital signal processing scheme is demonstrated by the experiment of 112 Gb/s QDB spectrum shaped PM-QPSK signal with a 25 GHz bandwidth waveshaper for Nyquist WDM (NWDM) channels.

Figure 1:
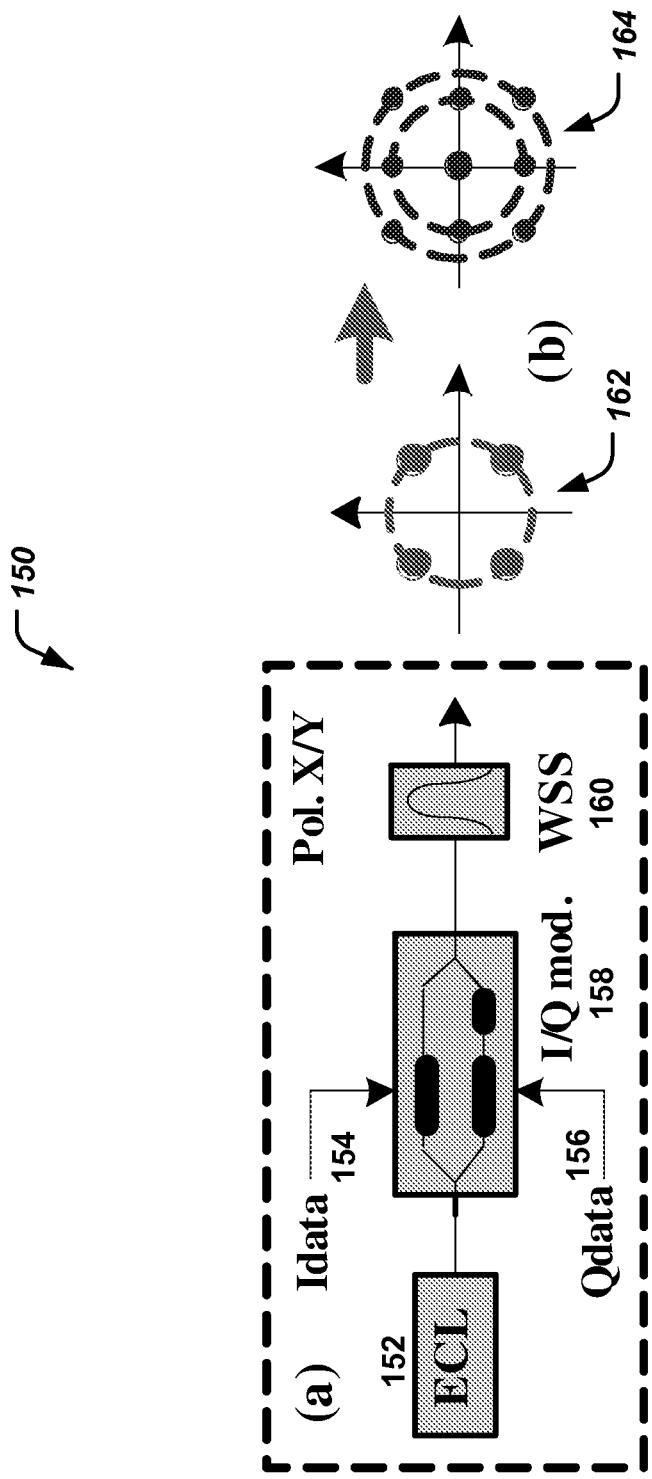
FIG. 1 shows (a) example Quadrature Duo-Binary (QDB) spectrum shaped Polarization Modulated QPSK (PM-QPSK) by WSS or waveshaper for one pol.; (b) Constellation of PM-QPSK signal before and after QDB spectrum shaping.

With reference to FIG. 1(a) and FIG. 1(b), the spectral shaping can be performed by either two electrical low-pass filters in electrical domain or an optical band-pass filter after the optical QPSK modulation in optical domain with same performance. For PM-QPSK signals with symbol rate of Rs, we use a waveshaper or wavelength selective switch (WSS) 160 with 3 dB pass bandwidth of Rs or less for spectral shaping as shown in FIG. 1 (a). The system 150 includes optical source ECL 152, on which I data 154 and Q data 156 is modulated to produce I/Q data 158, which is then passed through the WSS 160. The PM-QPSK signal constellations before and after QDB spectrum shaping are shown in FIG. 1 (b). After QDB spectrum shaping, the 4-point QPSK signal (162) becomes a 9-point duobinary QPSK signal with zero point in constellation due to the filtering effect (164). The QDB shaped signal is significantly spectrum narrower compared with QPSK, and the spectral side lobes are also greatly suppressed. The 9 points of QDB QPSK signals are located on three circles with different radii (see FIG. 2).

According the three modulus constellation location, new multi-modulus DSP schemes are disclosed for QDB spectrum shaped signals. These DSP algorithms including polarization demultiplexing, frequency offset estimation (FOE) and carrier phase recovery (CPR) are described and then simulated with 112 Gb/s QDB spectrum shaped PM-QPSK simulation results as follows.

Cascaded Multi-Modulus Algorithm for QDB PM-QPSK

For QDB spectrum shaped PM-QPSK, classic CMA is not well compatible. This is because 9-point signal does not present constant symbol amplitude. It not only leads to extra noise after equalization, but also causes a problem with filter taps frequency response. Thus, we use CMMA disclosed and used in PM 8-QAM systems with good modulus decision performances for blind polarization de-multiplexing.

Figure 2:
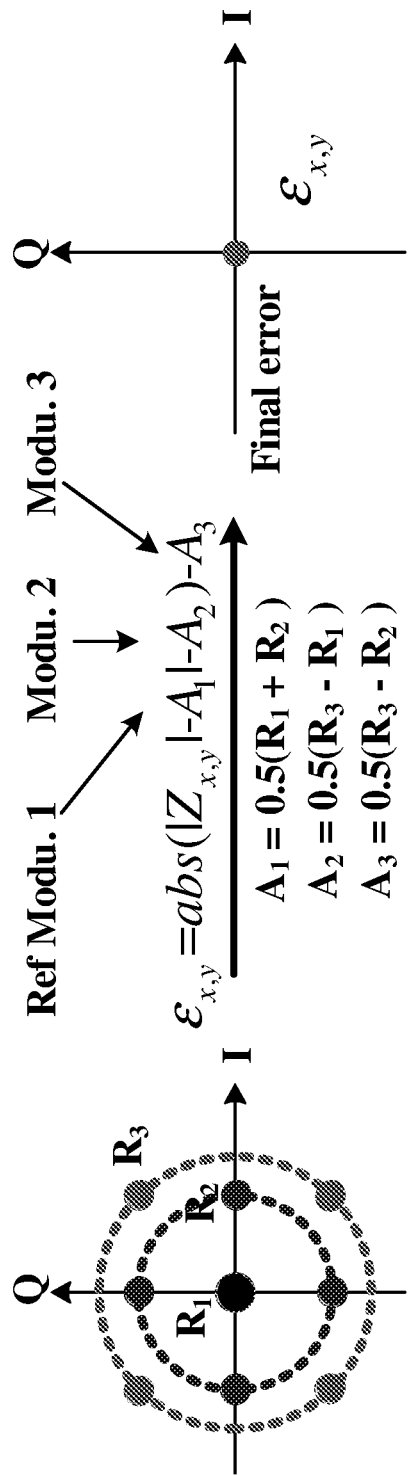
FIG. 2 illustrates CMMA for QDB spectrum shaped PDM-QPSK.

Some aspects of CMMA for QDB spectrum shaped PDM-QPSK signals are shown in FIG. 2. It is also a four butterfly-configured adaptive digital equalizer. Here, $\epsilon_{x,y}$ is the feedback signal error for filter tap updating. By introducing three reference circles A1~A3, the final error can approach zero for ideal QDB signal as worked in 8 QAM signals. R1~R3 are the radius of the three modulus QDB PDM-QPSK signal and Zx,y is the output of equalizer. As a result, it is clear that the regular CMA error signal will not approach zero even for an ideal 9-point signal.

Joint-Polarization QPSK Partitioning FOE

The partition scheme has been presented in for FOE in a 16-QAM coherent system, the regular m-power algorithm can be also used for FOE for the 9-point QDB spectrum shaped signal with partitioning. On the other hand, for polarization multiplexed coherent system, the same transmitter and LO are used for the two polarizations signals. In this way, both polarizations signals are affected by the same frequency offset. To address this issue, we use a joint-polarization QPSK partitioning algorithm for FOE.

Figure 3:
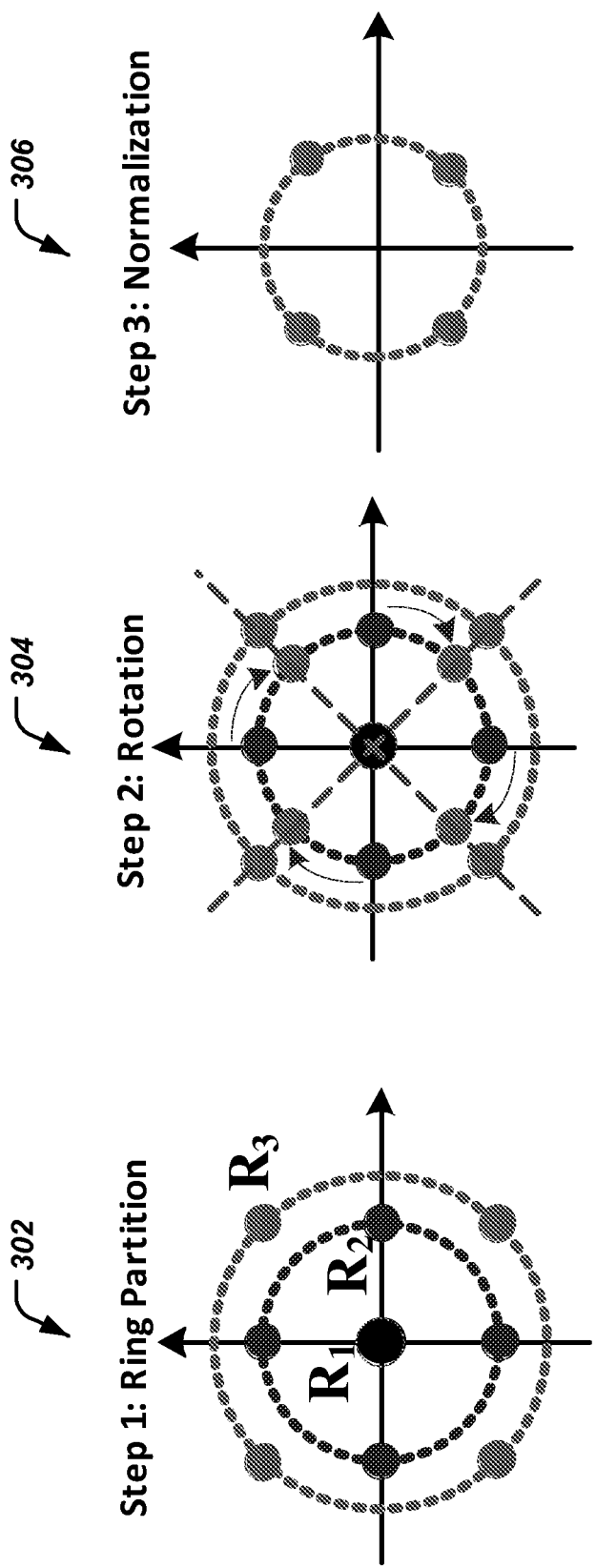
FIG. 3 illustrates QPSK partition and rotation.
Figure 4:
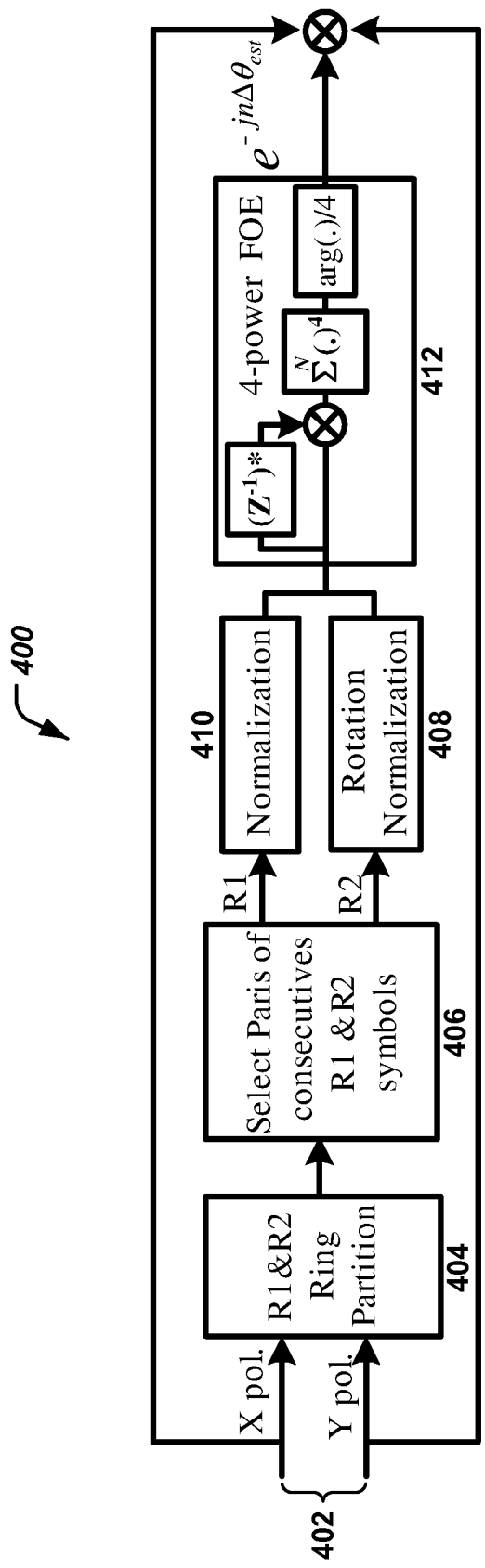
FIG. 4 is a block diagram representation of joint-polarization QPSK partitioning FOE.

FIGS. 3 and 4 show the principle and block diagram 400 for disclosed Joint Polarized QPSK modulation Partition Algorithm (JPMPA) for FOE. After polarization demultiplexing by CMMA, the incoming X and Y pol. symbols (402) are first partitioned into three groups with different circle radius (404, 302). In some embodiments, only pairs of consecutive R1 and R2 symbols are selected (406) for estimation to reduce the complexity of the algorithm. Then R2 symbols are first rotated with $-\pi/4$ angle (408, 304) and then normalized (306). However, R1 symbols are only normalized (410). After that, the two groups can combine together with a "QPSK" like constellation. In this way, the 4 power frequency estimation for QPSK can operate now. For N pairs of R1 and R2 symbols, the phase angle estimation caused by frequency offset is (412):

$$\Delta\theta_{est} = 2\pi\Delta f_{est}T_s = \frac{1}{4}\arg\sum_{1}^{N}(S_{k+1}\cdot S_k^*)^4 \qquad (1)$$

Here, $S_k$ is the combined normalized symbols of R1 and R2 groups, $T_s$ is the symbol duration and $\Delta f_{est}$ is the estimated frequency offset. Then the frequency offset can be compensated by $e^{-jn\Delta\theta_{est}}$ for both polarization symbols. The frequency offset $\Delta f_{est}$ can be estimated with in $[-1/(8\,T_s), +1/(8\,T_s)]$ for $4^{th}$ power operation.

Two Stages QPSK Partitioning/ML Carrier Phase Recovery

Figure 5:
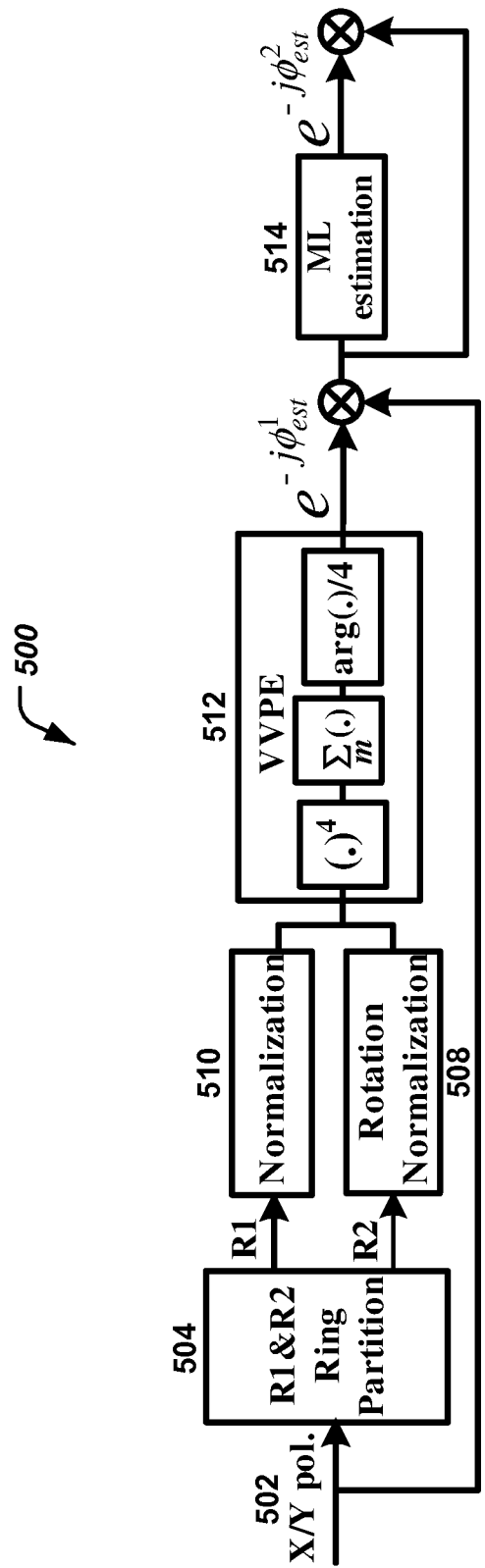
FIG. 5 is a block diagram representation of two stages phase estimation based on QPSK partitioning/ML.

As analyzed above, the QPSK partitioning scheme can be also used in the CPR for QDB spectrum shaped signals. On the other hand, maximum likelihood algorithm shows good improvement and low complexity for 16 QAM phase estimation. In this way, we propose a two stage phase recovery based on QPSK Partition/ML is shown in system 500 of FIG. 5 with respect to X/Y polarized input 502.

Some aspects of R1 and R2 ring partition (504), rotation and normalization (508 and 510) is the same as shown in FIG. 3. In practice, the partition steps for FOE and phase recovery can become one. After that, the symbols in R2 are first rotated with $-\pi/4$ angle and then normalized, while R1 symbols are only normalized and then combined with R2 symbols. Here, all the combined symbols can be used in groups and m is the number of symbols in each group. In this way, the first stage phase $\phi_{est}^1$ can be eliminated by Viterbi and Viterbi phase estimation (VVPE) 512 as:

$$\phi_{est}^1 = \left(\sum_m S_k^4\right)/4 \quad (2)$$

the second stage of phase $\phi_{est}^2$ estimation (514) based on ML as:

$$\phi_{est}^2 = \tan^{-1}(\text{Im}[h]/\text{Re}[h]), h = \sum_m x_k \cdot y_k^* \quad (3)$$

Here, yk is the decision of xk after the first stage phase recovery. The second stage phase recovery is implemented before final output.

Performances with Simulation Results

The simulation is carriers out with the disclosed DSP scheme with 112 Gb/s PM-QPSK signals. The QDB spectrum shaping is operated by a 4th order Gaussian optical band pass filter with different 3-dB bandwidth which is close to a commercial waveshaper. After DSP mentioned above, the final output is detected by MLSD for data BER measurement.

Figure 6:
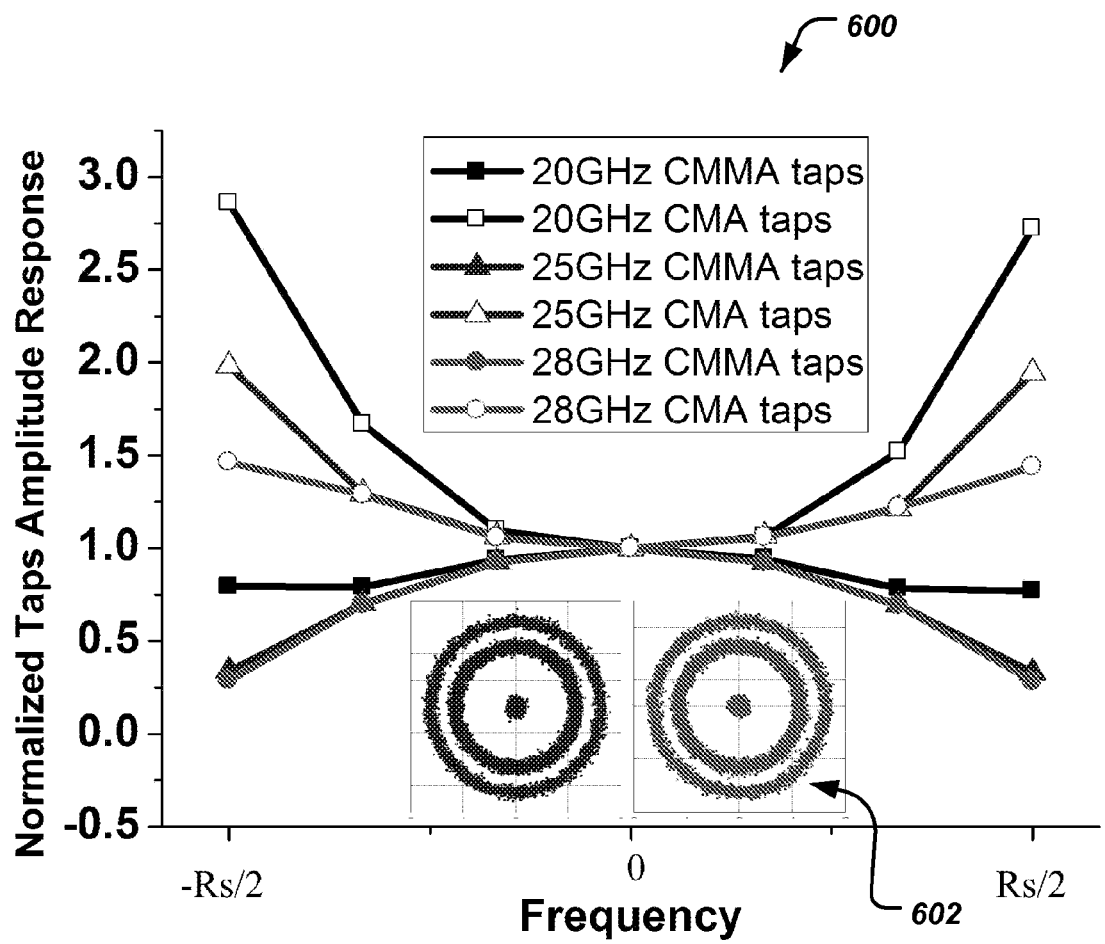
FIG. 6 illustrates an example in which normalized taps amplitude frequency response for CMMA and CMA under different spectrum shaping bandwidth.

FIG. 6 shows the normalized taps amplitude frequency response with in Nyquist bandwidth for CMMA and CMA taps from 20 GHz to 28 GHz spectrum shaping. Here Rs is the symbol rate. It shows that CMMA have better performance with frequency response to compress the noise. For shaper spectrum shaping, the noise around ±Rs/2 can be significantly enhanced for Nyquist WDM channels. However, CMMA taps are in compression at ±Rs/2. The constellations after CMMA are shown as an insertion 602 in FIG. 6.

Figure 8A:
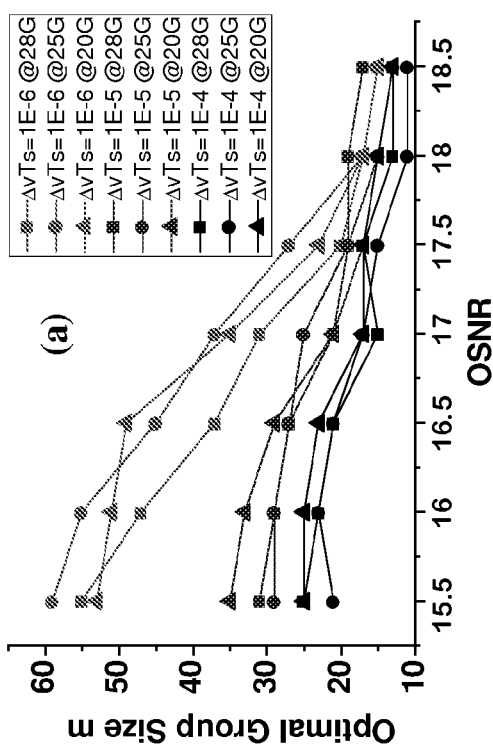
FIGS. 8A-8B are a graphical representation of (A) Optimum group size m varying with OSNR for different linewidth and QDB bandwidth; and (B) OSNR penalty at BER of 1E-3 varying with linewidth for different QDB bandwidth.
Figure 8B:
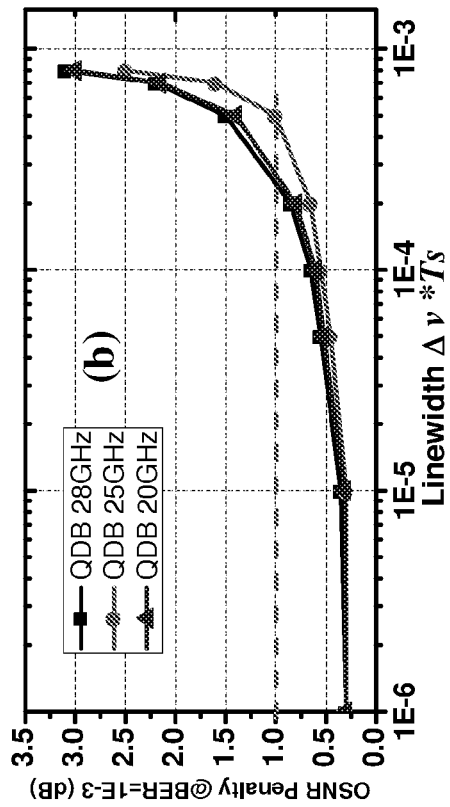

FIG. 7(*a*) shows the impact of block size N, in Eq. 1 of the disclosed FOE algorithm on BER performance for different QDB spectrum shaping bandwidth and OSNR (chart 702). Here, we keep the offset frequency with $\Delta f \cdot Ts=0.1$ and linewidth of signal source and LO with $\Delta v=100$ kHz. We can see that, N=10000 (near 704) is the optimal block size for FOE under different QDB spectrum shaping bandwidth and OSNR. FIG. 7(*b*) chart 752 shows the performance of FOE results for different frequency offset in the whole FOE range under different QDB spectrum shaping bandwidth with OSNR at 16 dB. The disclosed FEO algorithm shows good estimation accuracy within the whole estimation range for different QDB spectrum shaping bandwidth FIG. 8(*a*) shows the optimum group size m in Eq. 2 and 3 of disclosed two stage CPR algorithm varies with OSNR for different linewidth and QDB spectrum shaping bandwidth. It shows that, the optimum m deceases with OSNR and linewidth. The optimal m becomes larger and more sensitive to ASE noise when they are dominant with smaller linewidth. On the other hand, when ASE noise gets lager with smaller OSNR, larger group size m is needed for phase estimation and recovery. Simulation results of OSNR penalty (at BER of $1\times10-3$) for different QDB spectrum shaping bandwidth varying with linewidth $\Delta v^*Ts$ is shown in FIG. 8(*b*). The QDB bandwidth of 25 GHz shows the best performance and it can for can tolerate $\Delta v^*Ts$ of 5E-4 with OSNR penalty of 1 dB.

Figure 9:
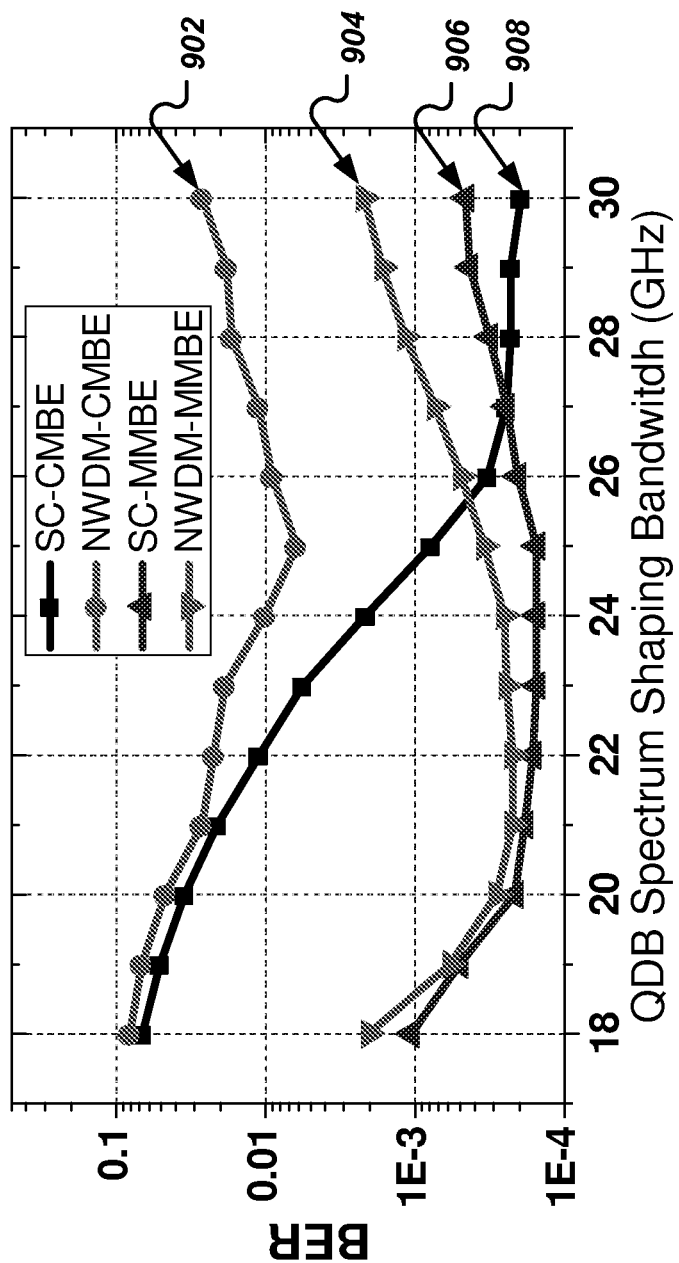
FIG. 9 shows simulation results of BER performance varying with QDB spectrum shaping bandwidth for different DSP schemes.

FIG. 9 shows the simulation results of back to back BER performance varying with QDB spectrum shaping bandwidth for the conventional constant modulus algorithms of CMBE (906, 908), and our disclosed multi-modulus algorithms of MMBE for both single carrier (SC) and NWDM. Here we keep the OSNR at 16 dB. It shows that, the disclosed MMBE scheme (902, 904) has better tolerance for strong QDB spectrum shaping and also crosstalk form other channels. The conventional CMBE for NWDM has the worst performance due to the crosstalk and strong shaping. It also shows that the optimal QDB spectrum shaping bandwidth for our disclosed MMBE scheme is from 23 to 25 GHz for SC and 21 to 23 for NWDM

Experiment Results

The effectiveness of the disclosed method has also been tested in a 28 Gbaud QDB spectrum shaped NWDM PM-QPSK back-to-back experiment. The NWDM subchannels are from a comb generator based on phase and intensity modulators with 25 GHz carrier spacing and equal tone power. For QPSK modulation, the 28-Gbaud binary electrical signals are generated from an electrical two channels pulse pattern generator (PPG) with a word length of 213-1. The I/Q modulator is biased at the null point and driven at full swing to achieve zero-chirp 0 and π phase modulation. The polarization multiplexing of the signal is realized by the polarization multiplexer, which comprises a PM-OC to halve the signal, an optical delay line to provide a delay of 150 symbols, and a polarization beam combiner (PBC) to recombine the signal. The even and odd channels are modulated and polarization multiplexed individually. After that, they are combined and QDB spectrum shaped by a commercial WSS with a 3 dB bandwidth of 19.5 GHz and 25 GHz spacing. At the receiver, one tunable band-pass filter (BPF) with 3 dB bandwidth of 0.4 nm is employed to choose the measured subchannel. Polarization and phase diverse coherent homodyne detection is employed at the receiver. Here, the linewidth of ECL at the transmitter and LO at the receiver is both smaller than 100 kHz. The Analog/Digital conversion (ADC) is realized in the digital scope with the sample rate of 50-GSa/s. The received data is then offline digital processed by a computer. The data is first resampled to 56 Gsa/s and then processed by disclosed MMBE algorithms for polarization demultiplexing, carrier frequency offset estimation and phase recovery before BER measurement.

Figure 10:
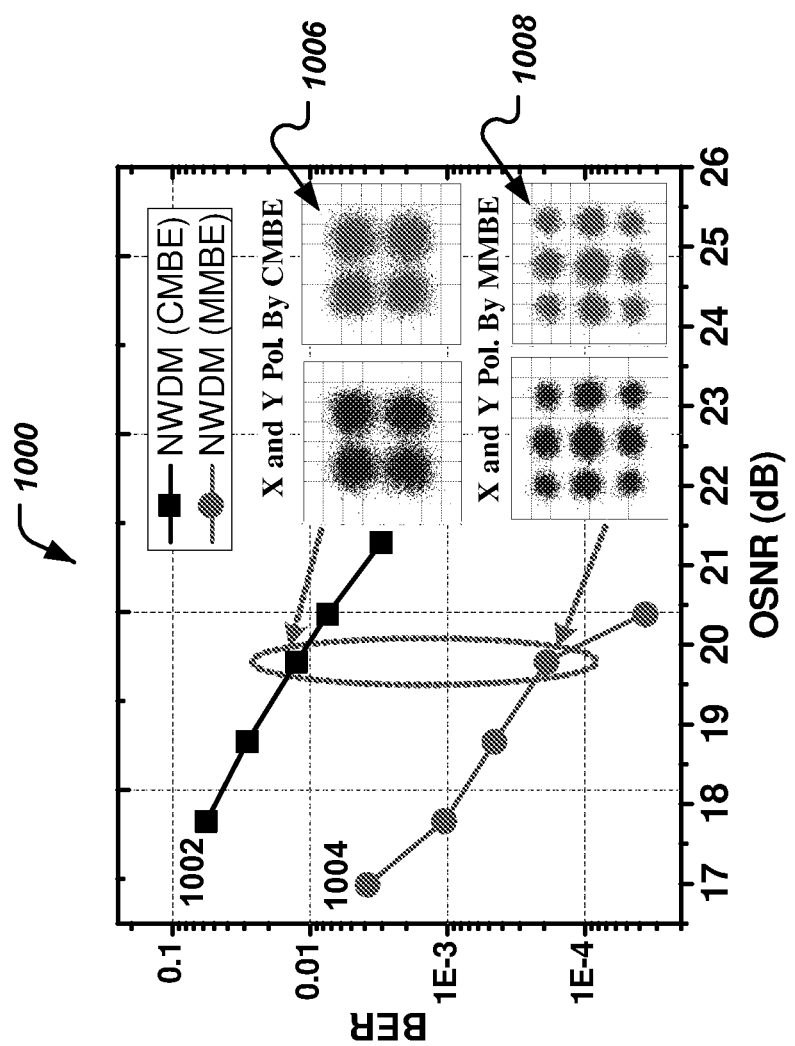
FIG. 10 illustrates back to back BER performance varying with OSNR for different DSP schemes.

FIG. 10 shows the measured back to back BER performance varying with OSNR for regular CMBE and disclosed MMBE schemes as a comparison (1000). It shows that, our scheme based on multi-modulus scheme MMBE (lower curve) shows better BER performance compared with conventional CMBE scheme (upper curve). The constellations of X and Y pol. obtained by the two schemes at OSNR of 19.8 dB are also inserted in FIGS. 10 (1006 and 1008). We can see an enhanced suppression of noise for the 9-point constellation obtained by our scheme.

We have disclosed and experimentally demonstrated a novel DSP scheme for QDB spectrum shaped PM-QPSK based on MMBE. The algorithms for this novel DSP scheme include CMMA for blind polarization de-multiplexing, multi-modulus QPSK partitioning FOE and two stages CPR with ML phase estimation. The final signal is detected by MLSD for data BER measurement. The feasibility of the disclosed digital signal processing scheme is demonstrated by the experiment of 112 Gb/s PM-QPSK signal which is QDB shaped by a 25 GHz bandwidth waveshaper for NWDM channels. Our scheme shows better BER performance compared with conventional CMBE scheme.

Figure 11:
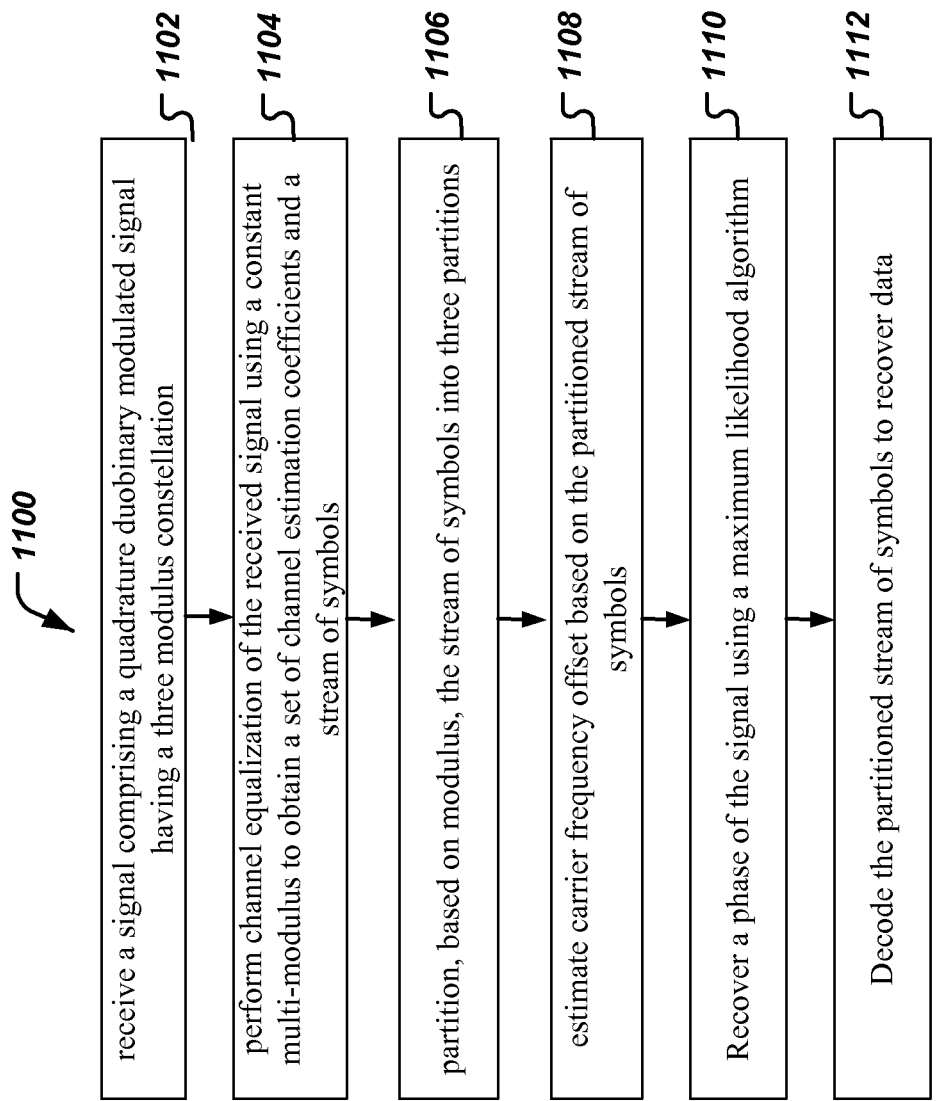
FIG. 11 is a flowchart representation of a process of optical communication.

FIG. 11 is a flow chart representation of a method 1100 for optical communications. In some implementations, the method may be implemented at the receiver side of an optical communication system. At 1102, a signal comprising a quadrature duobinary modulated signal having a three modulus constellation is received. In some implementations, the signal may be produced by spectrally shaping I and Q symbols streams through electrical low-pass filters in the electrical domain. In some implementations, the signal may be produced using an optical domain bandpass filter after I and Q symbols are modulated using optical domain QPSK. In some implementations, a constellation having a predetermined number of moduli constellation (e.g., nine) may be used.

At 1104, channel equalization of the received signal is performed using a constant multi-modulus to obtain a set of channel estimation coefficients and a stream of symbols. In some implementations, techniques such as discussed with reference to FIG. 2 and FIG. 3 are used.

At 1106, based on modulus, the stream of symbols is partitioned into three partitions. In some implementations, another predetermined number of partitions are used (e.g., nine).

At 1108, carrier frequency offset of the signal is estimated, based on the partitioned stream of symbols.

At 1110, a phase of the signal is recovered using a maximum likelihood algorithm.

At 1112, the partitioned stream of symbols is decoded to recover data.

Figure 12:
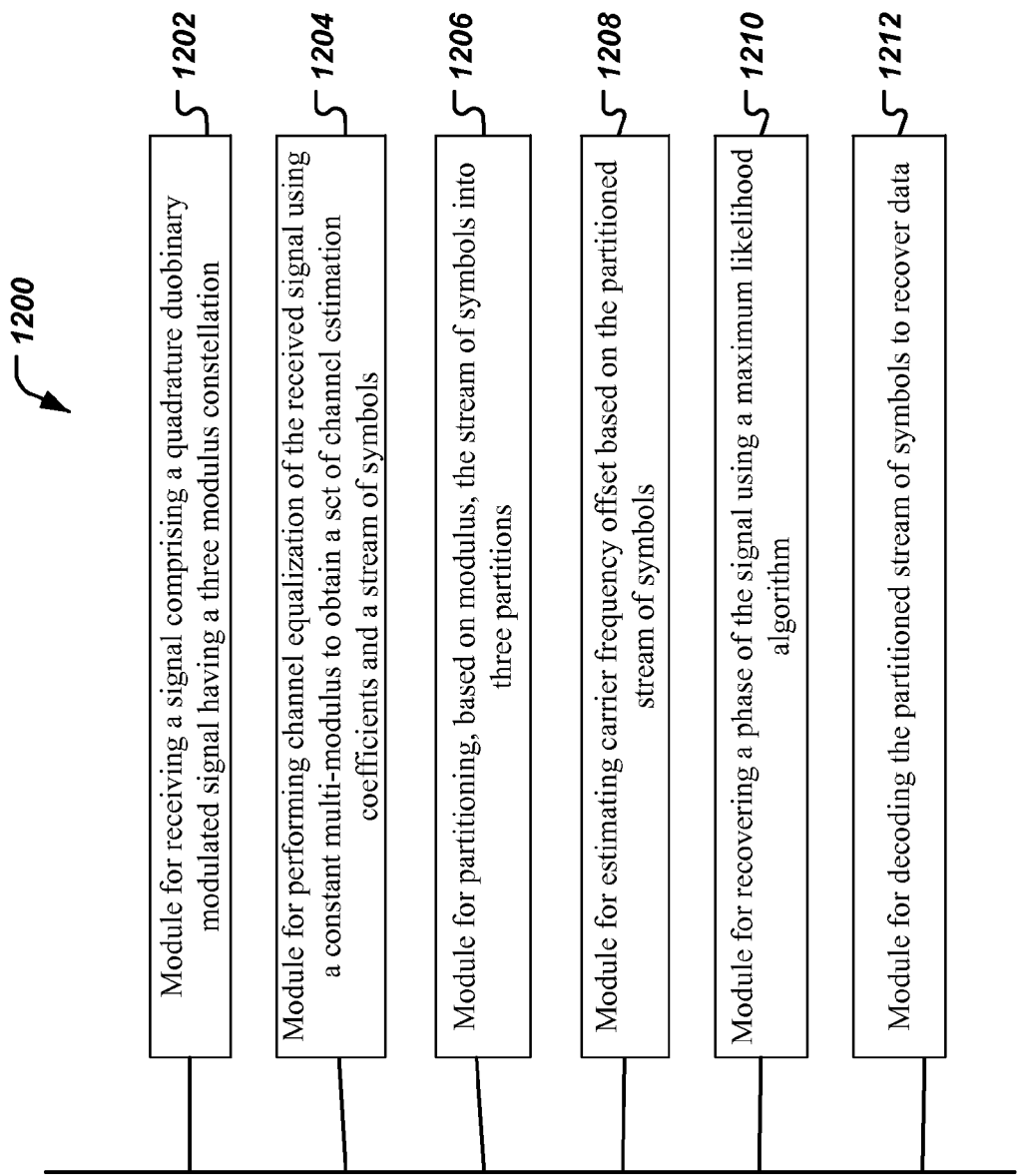
FIG. 12 is a block diagram representation of a portion of an optical communications receiver.

FIG. 12 is a block diagram representation of an apparatus 12 for receiving optical communications signals is depicted. The module 1202 is for receiving a signal comprising a quadrature duobinary modulated signal having a three modulus constellation. The module 1204 is for performing channel equalization of the received signal using a constant multi-modulus to obtain a set of channel estimation coefficients and a stream of symbols. The module 1206 is for partitioning, based on modulus, the stream of symbols into three partitions. The module 1208 is for estimating carrier frequency offset based on the partitioned stream of symbols. The module 1210 is for recovering a phase of the signal using a maximum likelihood algorithm. The module 1212 is for decoding the partitioned stream of symbols to recover data.

It will be appreciated that novel techniques for receiving modulated optical signals are disclosed. The disclosed techniques offer superior performance over conventional techniques by achieving an order of magnitude higher bit error rate (BER) for the same SNR, or alternatively achieving 3 dB improvement for the same BER.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. An optical communications method, comprising:
    receiving a signal comprising a quadrature duobinary modulated signal having a three modulus constellation;
    performing channel equalization of the received signal using a cascaded multi-modulus to obtain a set of channel estimation coefficients and a stream of symbols;
    partitioning, based on modulus, the stream of symbols into three partitions,
    estimating carrier frequency offset based on the partitioned stream of symbols;
    recovering a phase of the signal using a maximum likelihood algorithm;
    decoding the partitioned stream of symbols to recover data; and
    rotating at least some constellation points;
    wherein the rotating comprises rotating by π/4 angle.

2. The method recited in claim 1, wherein the rotating operation is performed during the operation of estimating the carrier frequency offset.

3. The method recited in claim 1, wherein the rotating operation is performed during the operation of recovering the phase of the signal.

4. The method of claim 1, wherein the three modulus constellation comprises a nine symbol quadrature amplitude modulation constellation.

5. An optical communications method, comprising:
    receiving a signal comprising a quadrature duobinary modulated signal having a three modulus constellation;
    performing channel equalization of the received signal using a cascaded multi-modulus to obtain a set of channel estimation coefficients and a stream of symbols;
    partitioning, based on modulus, the stream of symbols into three partitions,
    estimating carrier frequency offset based on the partitioned stream of symbols;
    recovering a phase of the signal using a maximum likelihood algorithm;
    decoding the partitioned stream of symbols to recover data;
    wherein the recovering operation is performed by first using a Viterbi-Viterbi phase estimation algorithm and then using the maximum likelihood algorithm.

6. The method of claim 5, wherein the rotating operation is performed during the operation of estimating the carrier frequency offset.

7. The method of claim 5, wherein the rotating operation is performed during the operation of recovering the phase of the signal.

8. The method of claim 5, wherein the three modulus constellation comprises a nine symbol quadrature amplitude modulation constellation.

9. An optical communications apparatus, comprising:
    a receiver that receives a signal comprising a quadrature duobinary modulated signal having a three modulus constellation;
    a channel equalizer that performs channel equalization of the received signal using a cascaded multi-modulus to obtain a set of channel estimation coefficients and a stream of symbols;
    a symbol partitioner that partitions, based on modulus, the stream of symbols into three partitions;
    a frequency offset estimator that estimates carrier frequency offset based on the partitioned stream of symbols;
    a phase recoverer that recovers a phase of the signal using a maximum likelihood algorithm; and
    a data decoder that decodes the partitioned stream of symbols to recover data,
    wherein the phase recoverer recovers the phase of the signal by first using a Viterbi-Viterbi phase estimation algorithm and then using the maximum likelihood algorithm.

10. The apparatus recited in claim 9, further including:
    a rotator that rotates at least some constellation points.

11. The apparatus recited in claim 10, wherein the frequency offset estimator includes the rotator.

12. The apparatus recited in claim 10, wherein the phase recoverer includes the rotator.

13. The apparatus recited in claim 9, wherein the three modulus constellation comprises a nine symbol quadrature amplitude modulation constellation.

14. An optical communications method, comprising:
    receiving a signal comprising a quadrature duobinary modulated signal having a three modulus constellation;
    performing channel equalization of the received signal using a cascaded multi-modulus to obtain a set of channel estimation coefficients and a stream of symbols;

partitioning, based on modulus, the stream of symbols into three partitions including R1 symbols, R2 symbols and R3 symbols;

rotating and then normalizing the R2 symbols;

normalizing, without rotating, the R1 symbols;

estimating carrier frequency offset by combining the rotated and normalized R2 symbols together with the normalized R1 symbols;

recovering a phase of the signal using a maximum likelihood algorithm; and decoding the partitioned stream of symbols to recover data.

15. The method of claim 14, wherein the rotating and the normalizing are performed during the operation of estimating the carrier frequency offset.

16. The method of claim 14, wherein the rotating and the normalizing are performed during the operation of recovering the phase of the signal.

17. The method of claim 14, wherein the three modulus constellation comprises a nine symbol quadrature amplitude modulation constellation.

18. An optical communications apparatus, comprising:

a receiver that receives a signal comprising a quadrature duobinary modulated signal having a three modulus constellation;

a channel equalizer that performs channel equalization of the received signal using a cascaded multi-modulus to obtain a set of channel estimation coefficients and a stream of symbols;

a symbol partitioner that partitions, based on modulus, the stream of symbols into three partitions including R1 symbols, R2 symbols and R3 symbols;

a rotator that rotates the R2 symbols;

a normalizer that normalizes the rotated R2 symbols and the R1 symbols;

a frequency offset estimator that estimates carrier frequency offset by combining the rotated and normalized R2 symbols together with the normalized R1 symbols;

a phase recoverer that recovers a phase of the signal using a maximum likelihood algorithm; and a data decoder that decodes the partitioned stream of symbols to recover data.

19. The apparatus of claim 18, wherein the frequency offset estimator includes the rotator and the normalizer.

20. The apparatus of claim 18, wherein the phase recoverer includes the rotator and the normalizer.

* * * * *